United States Patent
Rober

(10) Patent No.: US 8,918,406 B2
(45) Date of Patent: Dec. 23, 2014

(54) INTELLIGENT ANALYSIS QUEUE CONSTRUCTION

(71) Applicant: Second Wind Consulting LLC, Crownsville, MD (US)

(72) Inventor: Donna Rober, Crownsville, MD (US)

(73) Assignee: Second Wind Consulting LLC, Crownsville, MD (US)

( * ) Notice: Subject to any disclaimer, the term of this patent is extended or adjusted under 35 U.S.C. 154(b) by 82 days.

(21) Appl. No.: 13/715,521

(22) Filed: Dec. 14, 2012

(65) Prior Publication Data

US 2014/0172874 A1  Jun. 19, 2014

(51) Int. Cl.
*G06F 7/00* (2006.01)
*G06F 17/30* (2006.01)

(52) U.S. Cl.
CPC .............................. *G06F 17/30867* (2013.01)
USPC ........... 707/748; 707/749; 707/750; 707/751; 704/231; 704/236; 704/246; 704/247; 704/251

(58) Field of Classification Search
USPC .......... 707/736, 748, 749, 750, 751; 704/231, 704/236, 246, 247, 251, 270
See application file for complete search history.

(56) References Cited

U.S. PATENT DOCUMENTS

| | | | |
|---|---|---|---|
| 5,375,173 A | 12/1994 | Sanada et al. | |
| 6,345,252 B1* | 2/2002 | Beigi et al. | 704/272 |
| 6,529,875 B1 | 3/2003 | Nakajima et al. | |
| 6,567,775 B1* | 5/2003 | Maali et al. | 704/231 |
| 6,618,702 B1 | 9/2003 | Kohler et al. | |
| 7,383,282 B2* | 6/2008 | Whitehead et al. | 707/700 |
| 7,567,901 B2* | 7/2009 | Chang | 704/247 |
| 7,606,707 B2 | 10/2009 | Kakino et al. | |
| 7,650,282 B1 | 1/2010 | Morris | |
| 2005/0273333 A1* | 12/2005 | Morin et al. | 704/247 |
| 2006/0287863 A1* | 12/2006 | Santos et al. | 704/275 |
| 2007/0203891 A1* | 8/2007 | Solaro et al. | 707/3 |
| 2008/0010065 A1 | 1/2008 | Bratt et al. | |
| 2012/0101822 A1* | 4/2012 | Dinerstein | 704/246 |
| 2013/0070964 A1* | 3/2013 | Nagamine et al. | 382/103 |

FOREIGN PATENT DOCUMENTS

| | | |
|---|---|---|
| EP | 0800158 A1 | 10/1997 |
| EP | 1431959 A2 | 6/2004 |

\* cited by examiner

*Primary Examiner* — Hares Jami
(74) *Attorney, Agent, or Firm* — Nelson Mullins Riley & Scarborough LLP

(57) ABSTRACT

A method of processing content files may include receiving the content file, employing processing circuitry to determine an identity score of a source of a portion of at least a portion the content file, to determine a word score based for the content file and to determine a metadata score for the content file, determining a composite priority score based on the identity score, the word score and the metadata score, and associating the composite priority score with the content file for electronic provision of the content file together with the composite priority score to a human analyst.

15 Claims, 6 Drawing Sheets

INTELLIGENT ANALYSIS QUEUE CONSTRUCTION

TECHNICAL FIELD

Example embodiments generally relate to analysis of intelligence data and, more particularly, relate to a tool for analysis queue construction.

BACKGROUND

Many organizations may employ analysts to utilize analysis tools or otherwise manually process data to determine whether useful information is buried within the data. For example, audio files of recorded conversations for text associated therewith), video or image files recorded by surveillance cameras, text files associated with computer-related activity, and/or the like may be reviewed by analysts in an effort to isolate useful information therefrom. Given the massive amounts of data that can be generated using modern tools, the task of analyzing the data can be overwhelming.

Rather than simply continuing to hire more analysts, it may be desirable to provide organizations with a tool that can greatly increase the efficiency of analysts by constructing their analysis queues in an intelligent manner so that files that are most likely to generate useful information are prioritized over other files that are less likely to generate useful results.

BRIEF SUMMARY OF SOME EXAMPLES

Some example embodiments may provide an intelligent analysis queue construction system. The system may utilize a tool to enable analysis queues to be prioritized so that files that have a higher probability of including useful information based on certain key characteristics associated with the files may be assigned a higher priority than other cases that are less likely to include useful information. Accordingly, analyst time may be more efficiently allotted to prioritize analysis of high-interest files.

In an example embodiment, a method of processing content files is provided. The method may include receiving the content file, employing processing circuitry to determine an identity score of a source of a portion of at least a portion the content file, to determine a word score based for the content file and to determine a metadata score for the content file, determining a composite priority score based on the identity score, the word score and the metadata score, and associating the composite priority score with the content file for electronic provision of the content file together with the composite priority score to a human analyst.

In another example embodiment, an apparatus comprising processing circuitry is provided. The processing circuitry may be configured for receiving the content file, determining an identity score of a source of a portion of at least a portion the content file, determining a word score based for the content file and determining a metadata score for the content file, determining a composite priority score based on the identity score, the word score and the metadata score, and associating the composite priority score with the content file for electronic provision of the content file together with the composite priority score to a human analyst.

In another example embodiment, a computer program product comprising a computer-readable storage medium having computer-executable program code instructions stored therein is provided. The computer-executable program code instructions comprising program code instructions for receiving the content file, employing processing circuitry to determine an identity score of a source of a portion of at least a portion the content file, to determine a word score based for the content file and to determine a metadata score for the content file, determining a composite priority score based on the identity score, the word score and the metadata score, and associating the composite priority score with the content file for electronic provision of the content file together with the composite priority score to a human analyst.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
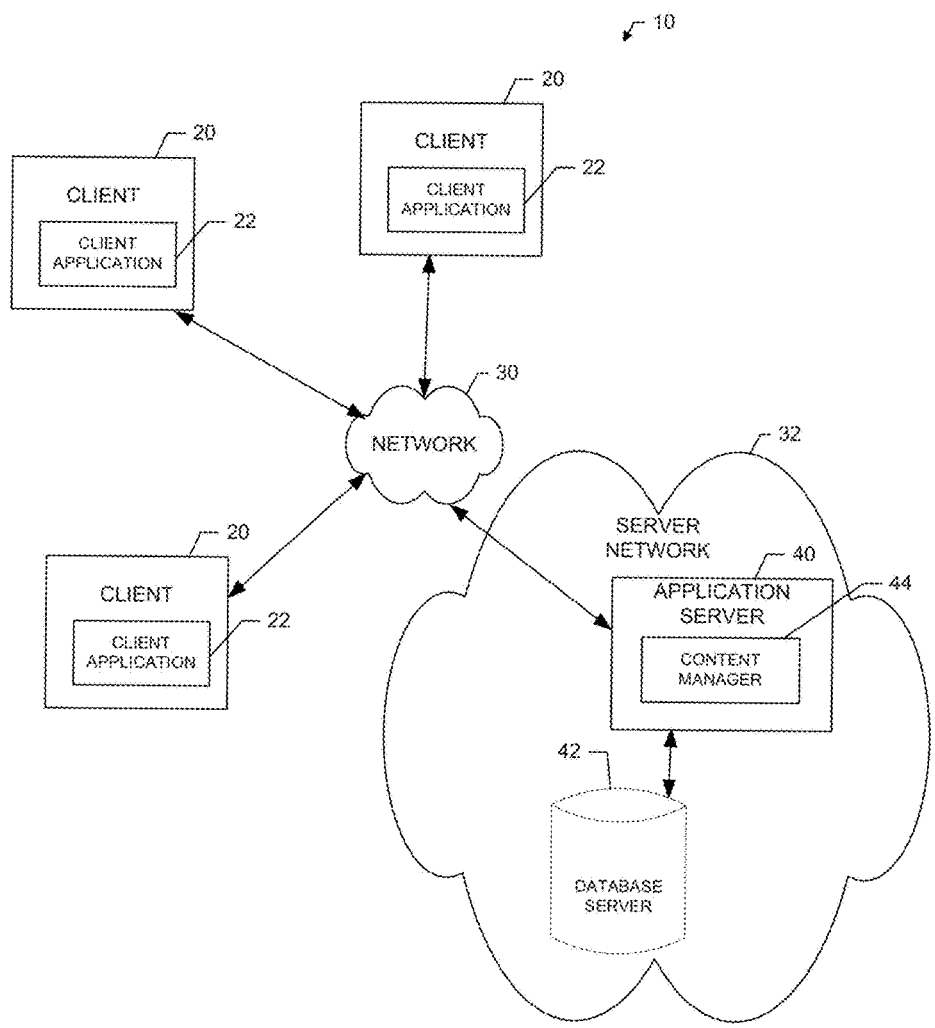
FIG. 1 illustrates a functional block diagram of a system for provision of intelligent queue construction according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Also, as used herein, the term "weight" should be understood to correspond to a score, value or numerically significant characteristic that may be associated with or assigned to a corresponding piece of data or information. Thus, for example, "weighting" may be understood to correspond to the assignment or association of a value, score or other numerically significant characteristic to a particular piece of data or information.

As indicated above, some example embodiments may provide an intelligent analysis queue construction system. The system may utilize a tool that may be implementable within a network, or on an individual analysis terminal, in order to enable analysis queues to be prioritized. File prioritization may be accomplished based on a weighting system that utilizes multiple characteristics of the corresponding files in order to prioritize the files that have a higher probability of including useful information. The characteristics that form the basis for prioritization may include word spotting (e.g., phonetic indexing) techniques, identity determination techniques, and/or file metadata. Accordingly, analyst time may be more efficiently allotted to prioritize analysis of high-interest files.

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The example described herein will be related to an asset comprising a computer or analysis terminal to illustrate one example embodiment. However, it should be appreciated that example embodiments may also apply to any asset including, for example, any programmable device that is capable of receiving and analyzing files as described herein.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization.

Each one of the clients 20 may include or otherwise be embodied as computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption at the clients 20). As such, for example, the client application 22 may include corresponding executable instructions for configuring the client 20 to provide corresponding functionalities as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the terminals or computers with which the clients 20 are associated. For example, the application server 40 may be configured to provide data sets or processed information associated with analysis of the data sets to clients 20 for use in connection with practicing example embodiments. Alternatively or additionally, the application server 40 may be configured to provide analytical tools in accordance with example embodiments.

In some embodiments, thr example, the application server 40 may therefore include an instance of a content manager 44 comprising stored instructions for handling activities associated with practicing example embodiments as described herein. As such, in some embodiments, the clients 20 may access the content manager 44 online and utilize the services provided thereby. However, it should be appreciated that in other embodiments, the content manager 44 may be provided from the application server 40 (e.g., via download over the network 30) to one or more of the clients 20 to enable recipient clients to instantiate an instance of the content manager 44 for local operation. As yet another example, the content manager 44 may be instantiated at one or more of the clients 20 responsive to downloading instructions from a removable or transferable memory device carrying instructions for instantiating the content manager 44 at the corresponding one or more of the clients 20. In such an example, the network 30 may, for example, be a peer-to-peer (P2P) network where one of the clients 20 includes an instance of the content manager 44 to enable the corresponding one of the clients 20 to act as a server to other clients 20.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the content manager 44 configured to operate in accordance with an example embodiment of the present invention. In this regard, for example, the content manager 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which analysts may interact with, configure or otherwise maintain the system 10.

Figure 2:
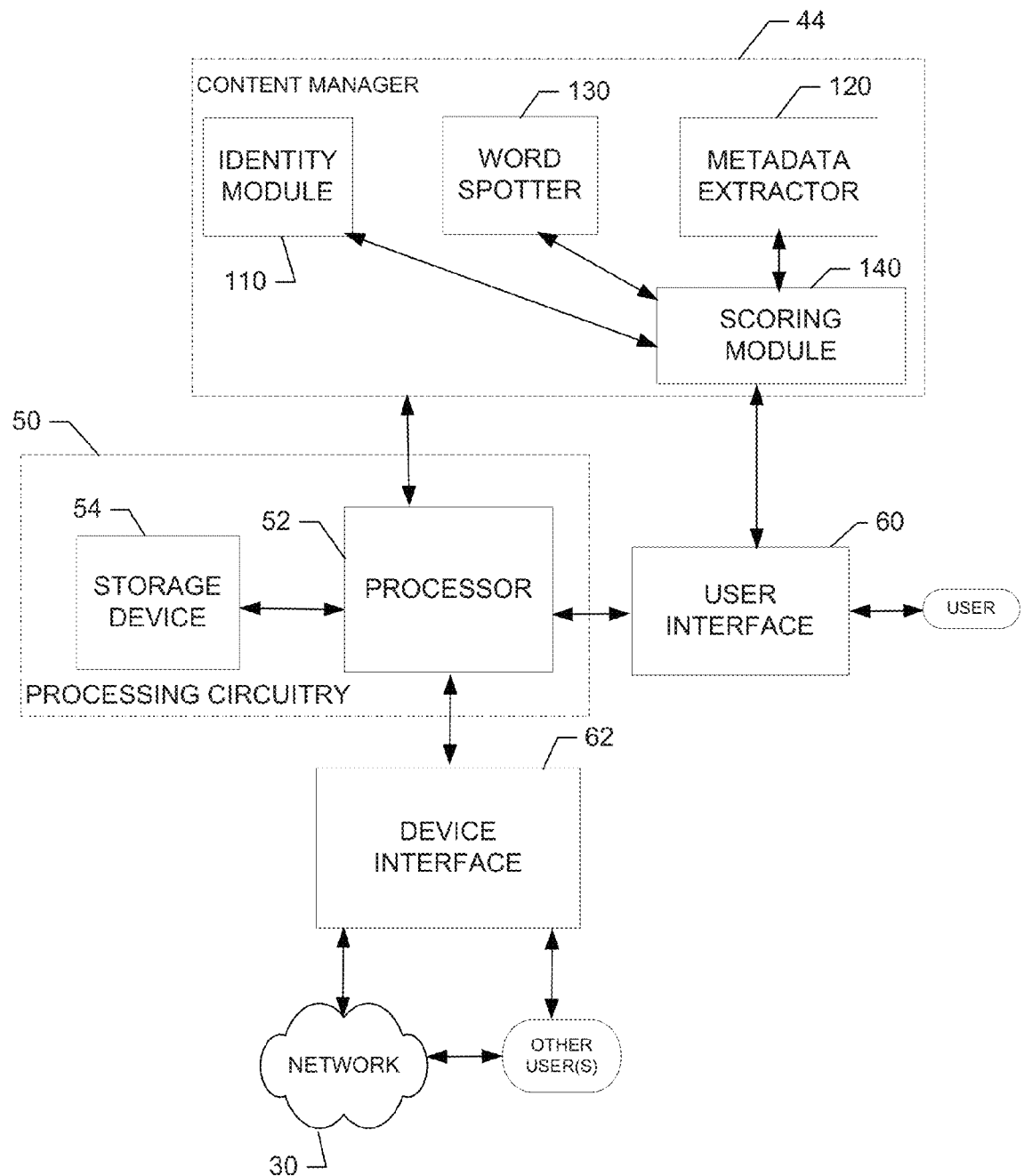
FIG. 2 illustrates a functional block diagram of an apparatus for provision of intelligent queue construction according to an example embodiment.

As such, the environment of FIG. 1 illustrates an example in which provision of content and information associated with the analysis such as, for example, intelligence operations may be accomplished by a particular entity (namely the content manager 44 residing at the application server 40). However, it should be noted again that the content manager 44 could alternatively handle provision of content and information within a single organization. Thus, in some embodiments, the content manager 44 may be embodied at one or more of the clients 20 and, in such an example, the content manager 44 may be configured to handle provision of content and information associated with analytical tasks that are associated only with the corresponding single organization. Access to the content manager 44 may therefore be secured as appropriate for the organization involved an credentials of individuals or analysts attempting to utilize the tools provided herein An example embodiment of the invention will now be described with reference to FIG. 2, FIG. 2 shows certain elements of an apparatus for provision of intelligent queue construction according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship e.g., the application server 40 and one or more clients 20). Furthermore, it should be noted that the devices or elements described below may not be mandatory and thus some may be omitted in certain embodiments.

Referring now to FIG. 2, an apparatus for provision of intelligent queue construction is provided. The apparatus may be an embodiment of the content manager 44 or a device hosting the content manager 44. As such, configuration of the apparatus as described herein may transform the apparatus into the content manager 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50 may be embodied as, include or otherwise control the content manager 44, which may be any means such as a device or circuitry operating in accordance with software or otherwise embodied in hardware or a combination of hardware and software processor 52 operating under software control, the processor 52 embodied as an ASIC or FPGA specifically configured to perform the operations described herein, or a combination thereof) thereby configuring the device or circuitry to perform the corresponding functions of the content manager 44 as described below.

The content manager 44 manager may include tools to facilitate the creation and distribution of content via the network 30. In an example embodiment, the content may be content files that are to be or have been placed in a file queue. In order to facilitate placement of the content files into the file queue, the content manager 44 may employ prioritization management. The content manager 44 may therefore be configured to act as a prioritization manager to analyze the content files and provide a scoring result or priority score for each of the content files. The content files may then be provided with the corresponding priority score so that the file queue can be created based on ordering of the priority scores of multiple content files.

In some embodiments, the content files may be distributed (e.g., by the application server 40) along with the corresponding priority scores and the file queue may be constructed remotely (e.g., at the client 20). In other cases, content files may be distributed in raw form and priority scoring and file queue construction may both be handled remotely. Regardless of where the file queue is constructed, after construction, a human analyst may then access each of the content files from the file queue such that the analyst is informed of the priority of the content files and prioritizes spending time on content files that have been prioritized above others based on their priority scores. By having the ability to see the priority scores associated with the files, or at least having the files placed in priority order, the analyst may operate more efficiently.

In some embodiments, the content manager 44 may further include one or more components that contribute to the priority scoring. For example, as shown in FIG. 2, the content manager 44 may include an identity module 110, a metadata extractor 120, a word spotter 130 and/or a scoring module 140. Each of the content manager 44, the identity module 110, the metadata extractor 120, the word spotter 130 and the scoring module 140 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the content manager 44, the identity module 110, the metadata extractor 120, the word spotter 130 and the scoring module 140, respectively, as described herein.

In an example embodiment, the identity module 110 may be configured to identify a source or subject of specific portions of the content. For example, if the content file is an audio file, the identity module 110 may configured to employ speaker identification to determine a source (i.e., the speaker) of one or more portions of the audio file. In this regard, for example, data may be stored in association with known speaker identities and the identity module 110 may be configured to compare data in a content file to the stored data to determine whether the data in the content file matches any stored data associated with any particular known speaker. Thus, for example, the identity module 110 may compare data associated with the content file to data in a speaker library to determine whether the data in the content file corresponds to one of the speakers in the speaker library. When a match is found (e.g., when the comparison yields a match or a correspondence that is above a predetermined threshold), the identity module 110 may correlate the content file to the corresponding speaker. Similarly, if the content file is an image, the identity module 110 may be configured to employ face recognition to determine a subject (i.e., a person in the image) of the image. The identity module 110 may therefore be configured to extract one or more faces and compare the faces to a library of known faces to attempt to make correlations between known faces and those in the image to identify subjects or a subject of the image. If a video file is analyzed, face and voice recognition techniques could be simultaneously employed. Thus, in various examples, the identity module 110 may be configured to determine the identity of the source or subject in image, video, text, audio or other types of multimedia files.

Some content files may include data associated with a plurality of speakers. Accordingly, in some embodiments, the identity module 110 may be enabled to tag specific time segments in association with the corresponding speaker of that segment. If the identity of the speaker of a segment is known, the segment may be tagged with the identity of the speaker. However, if the identity of the speaker of the segment is not known, the segment may remain untagged, or may be tagged with an unknown speaker tag. In some cases, where multiple unknown speakers are involved, each separate unknown speaker may include a different unknown speaker tag. As an alternative to tagging specific segments, the content file may simply have one or more tags identifying the speaker or speakers associated with the content file. In still other situations, no tags may be provided at all and speakers that are identified may simply have scoring or weighting values associated therewith and the corresponding weighting values associated with the speaker or speakers of a particular content file may be used by the scoring module 140 to provide a priority score for the content file (or a segment thereof), and the priority score may be provided. However, some embodiments may employ tags and weighting for use in connection with priority scores. In an example embodiment, the priority score associated with the identify module 110 may be referred to as an identity score.

In situations where input data is not audio file data, the identity module 110 may employ other identification and scoring techniques. For example, if the content file is text data (e.g., mails or other electronic correspondence), the identity module 110 may utilize IP address, email address, self identification or other indicators to determine the identity of individuals that are associated with the content files. Meanwhile, if the content file is image or video data, face identification techniques may be employed by the identity module 110 to identify individuals in the content file. In any case, scoring and/or tagging may be applied as described above.

In some embodiments, the metadata extractor 120 may be configured to extract metadata from the content file. Metadata is data that is descriptive of data. Thus, for example, metadata may provide data to indicate a location or time at which data has been gathered. In some cases, metadata may indicate an identity of a device or operator associated with data being generated. Accordingly, metadata may be indicative of a variety of environmental, contextual or other technical factors that may facilitate prioritizing content. For example, in some embodiments, metadata extracted from a particular content file may indicate that the content file is associated with a particular location, time, device, person, and/or the like. In some embodiments, specific metadata may be given scoring values to facilitate the creation of priority scores by the scoring module 140. In an example embodiment, the priority score associated with the metadata extractor 120 may be referred to as a metadata score.

In an example embodiment, the word spotter 130 (or phonetic indexer) may be configured to identify the occurrence of specific words, portions of words or combinations of words. In some cases, the word spotter 130 may further be configured to include a word library or lexicon of words of interest. The words of interest may be threat words or words associated with other topics of interest with respect to a particular task or project. The word spotter 130 may therefore be configured to parse audio or text data for the occurrence of words in the word library of words of interest. In an example embodiment, the word spotter 130 may conduct phonetic indexing via breaking words into phonemes and developing confidence level based determinations of the word or words being analyzed on the basis of the component phonemes detected in a given audio sample. Moreover, in some embodiments, the word spotter 130 may be configured to assign scoring values to a content file based on the presence of corresponding words from the word library of words of interest so that the scoring module 140 is enabled to create a priority score for the content file. In an example embodiment, the priority score associated with the word spotter 130 may be referred to as a word score.

The scoring module 140 may be configured to employ an algorithm for combining the inputs provided by the identity module 110, the metadata extractor 120, and/or the word spotter 130. Thus, for example, the scoring module 140 may be configured to generate a combined score (i.e., a composite priority score) for each content file based on confidence results associated with speaker identification, word spotting and/or metadata associated with each respective content file. In other words, the composite priority score may be a combination of the word score, the metadata score and the identity score. The composite priority score may be a sum of these values or may be weighted to give more credence to one or more of the constituent priority scores. The content files may then be provided in raw form along with a separate composite priority score to indicate the priority of the content files to the human analyst. A prioritization queue may also be constructed to order content files in accordance with the priority scores thereof.

Figure 3:
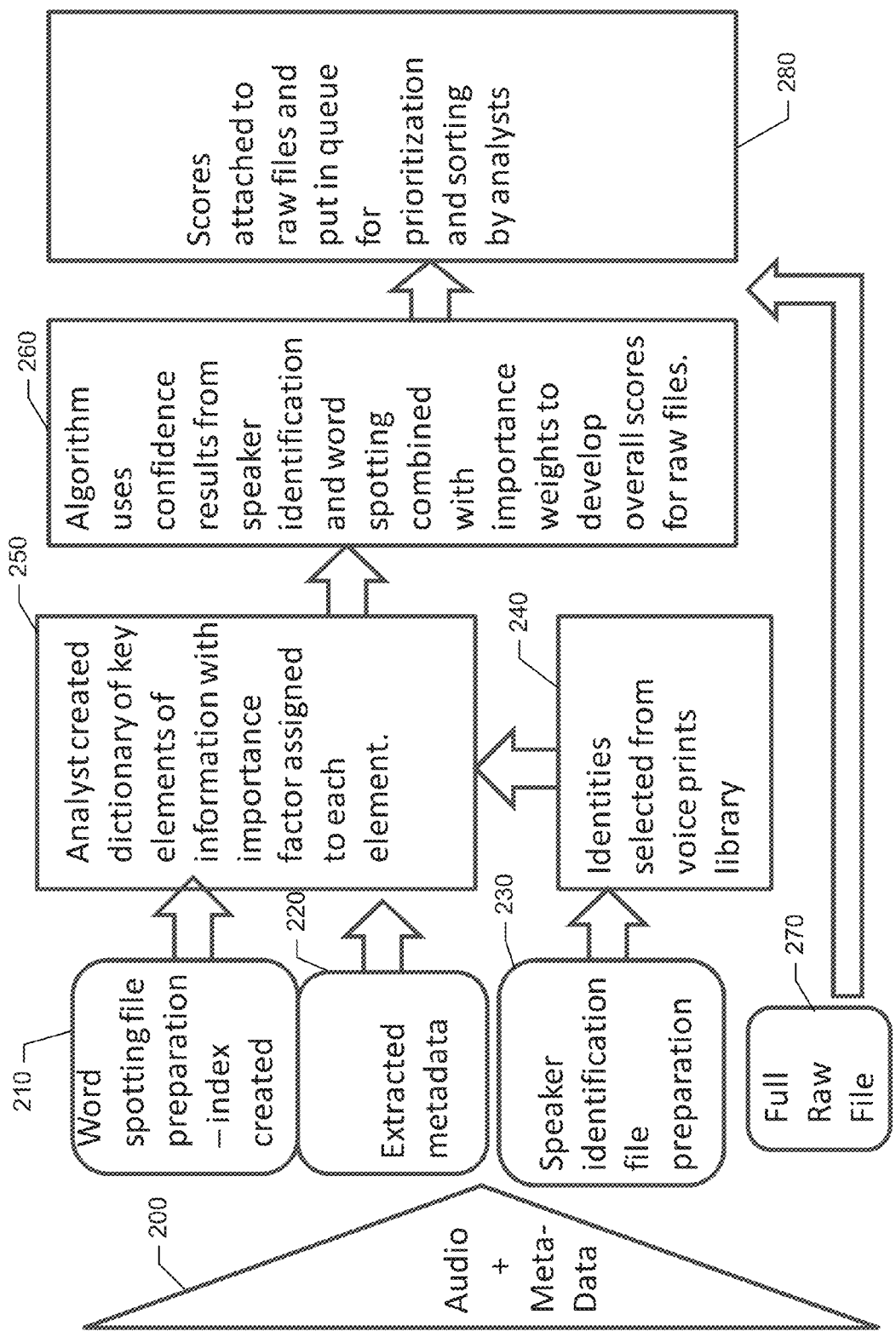
FIG. 3 illustrates a set of communication flow paths that may be enabled by the system of FIG. 1 according to an example embodiment.

FIG. 3 illustrates a set of communication flow paths that may be enabled by the system of FIG. 1 according to an example embodiment. Although FIG. 3 is provided to show an example in which the content file is an audio file, it should be appreciated that FIG. 3 is merely representative of one example content file. Other content files could also be employed that are related to other types of content. As shown in FIG. 3, an audio file 200 may be provided into the system, and the audio file 200 may have metadata associated therewith. Word spotting file preparation may be provided (e.g., by the word spotter 130) at operation 210 to create an index of words of interest associated with the audio file 200. Metadata may also be extracted (e.g., by the metadata extractor 120) at operation 220. A speaker identification file may also be created (e.g., via the identity module 110) at operation 230 and identities associated with the file may be selected from a voice print library at operation 240. The word spotting file preparation, speaker identification and/or the metadata extraction may be further processed via the use of a dictionary of key elements of information that may each have corresponding importance factors (e.g., weighting or scoring values) associated therewith at operation 250. At operation 260, an algorithm may be employed (e.g., by the scoring module 140) to utilize the confidence results from the speaker identification and word spotting, combined with importance weights to develop overall scores (e.g., composite priority scores) for the raw files 270. The scores may then be attached to the raw files 270 and the files may be put into a queue for prioritization and sorting by analysts at operation 280.

Figure 4:
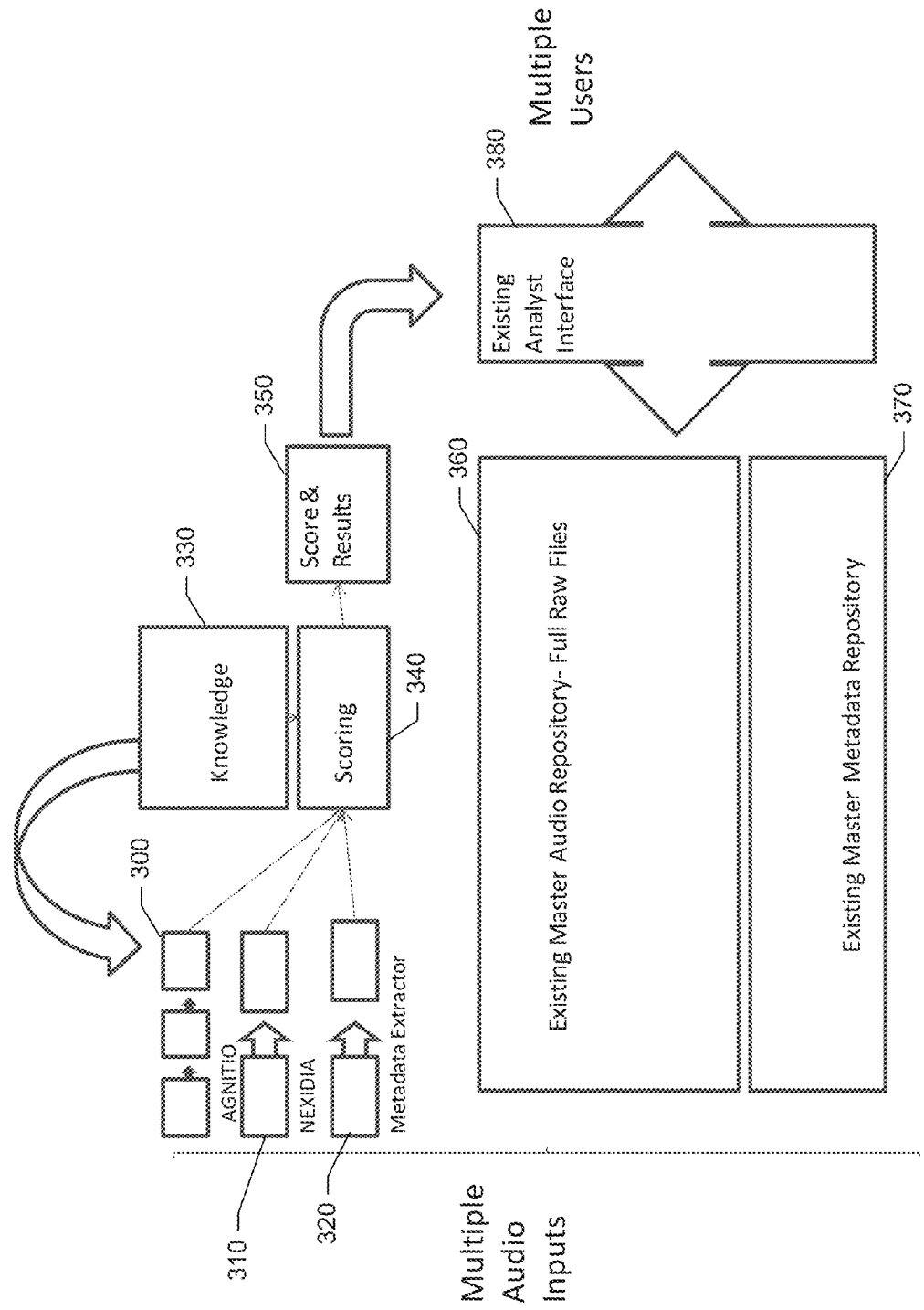
FIG. 4 illustrates another set of communication flow paths that may be enabled by the system of FIG. 1 according to an example embodiment.

FIG. 4 illustrates another set of communication flow paths that may be enabled by the system of FIG. 1 according to an example embodiment. As shown in the example of FIG. 4, audio inputs associated with phone call recordings may be provided and processed such that audio is converted to speaker files that are run through existing speaker libraries to generate and report results (e.g., by the identity module 110). In one embodiment, a product known as Agnitio 300 may be used as the identity module 110. However, other types of products capable of determining identity in other types of files (e.g., images, video, etc.) may alternatively be employed such as, for example, Cognitech®. Audio may also be fed to a Nexidia® engine 310 acting as the word spotter 130 to output phonetically indexed files. Meanwhile a metadata stripper 320 may be employed to separate call line information from audio and then report in CDF. Captured analytic knowledge 330 may then be run against Agnitio/Nexidia®/metadata output and all findings may be run through a scoring algorithm 340. Scoring results 350 (e.g., composite priority scores) may then be provided with the findings to be stored for pairing with the raw files which may be stored in connection with an audio repository 360. An existing master metadata repository 370 may also provide input for pairing at an analyst interface 380 (e.g., at one of the clients 20 or the application server 40) so that the information may be available to multiple credentialed users.

Figure 5:
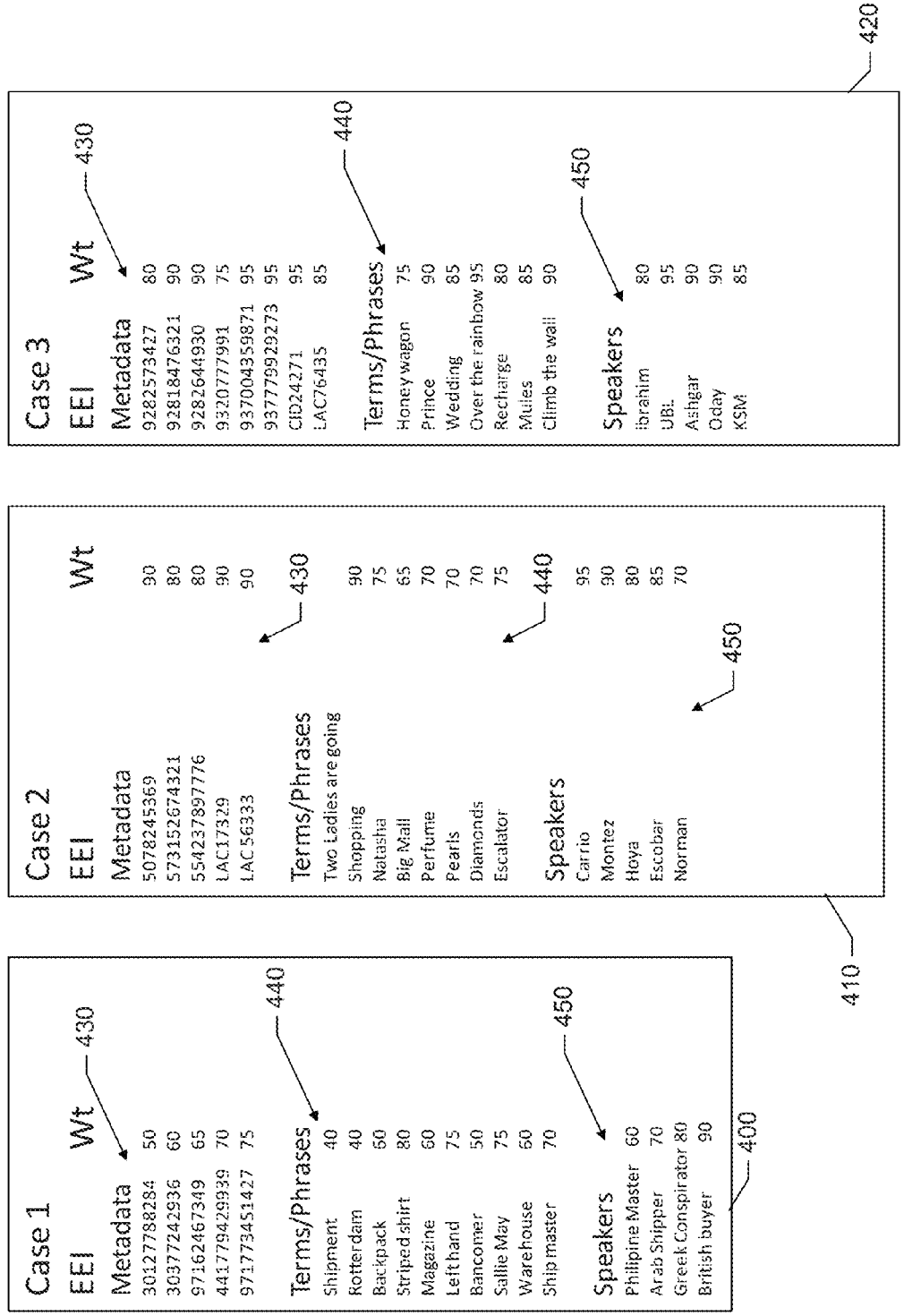
FIG. 5 illustrates an example of a weighting structure that may be provided according to an example embodiment.

FIG. 5 illustrates an example of a weighting structure that may be provided according to an example embodiment. In this regard, FIG. 5 illustrates three separate cases (400, 410 and 420) for which different metadata weights 430, term/phrase weights 440, and speaker weights 450 are defined. Data may be analyzed according to the corresponding case defined by the analyst, and a resulting priority score may be determined based on the scoring regime defined for the corresponding case by the scoring module 140. The content file associated with the data may then be assigned a priority score and placed in the queue along with an attached file indicating the priority score. The priority score may define or be included in a memo of the items used to develop the score so that the analyst can review the confidence values associated with each characteristic of the file (e.g., identity, metadata and/or word scores).

By employing an example embodiment, prioritized work queues may be built to enable operators to consistently process the content files that have the highest potential for providing useful intelligence first. Example embodiments may also provide an ability to capture analytic knowledge since each "dictionary" of weighted values may be built by a subject matter expert using the items of information that the corresponding expert knows to be pertinent to the specific problem or targeted communications. By capturing this knowledge, the knowledge can be shared with less experienced analysts as they can be exposed to prioritized content files as well as a results memo describing the priority score. The less experienced analysts may then better understand the process and training may be more effective. Meanwhile, more experienced operators may continue to work with files that do not meet a rapid processing threshold to continue to learn, identify new selectors and optimize capabilities.

Figure 6:
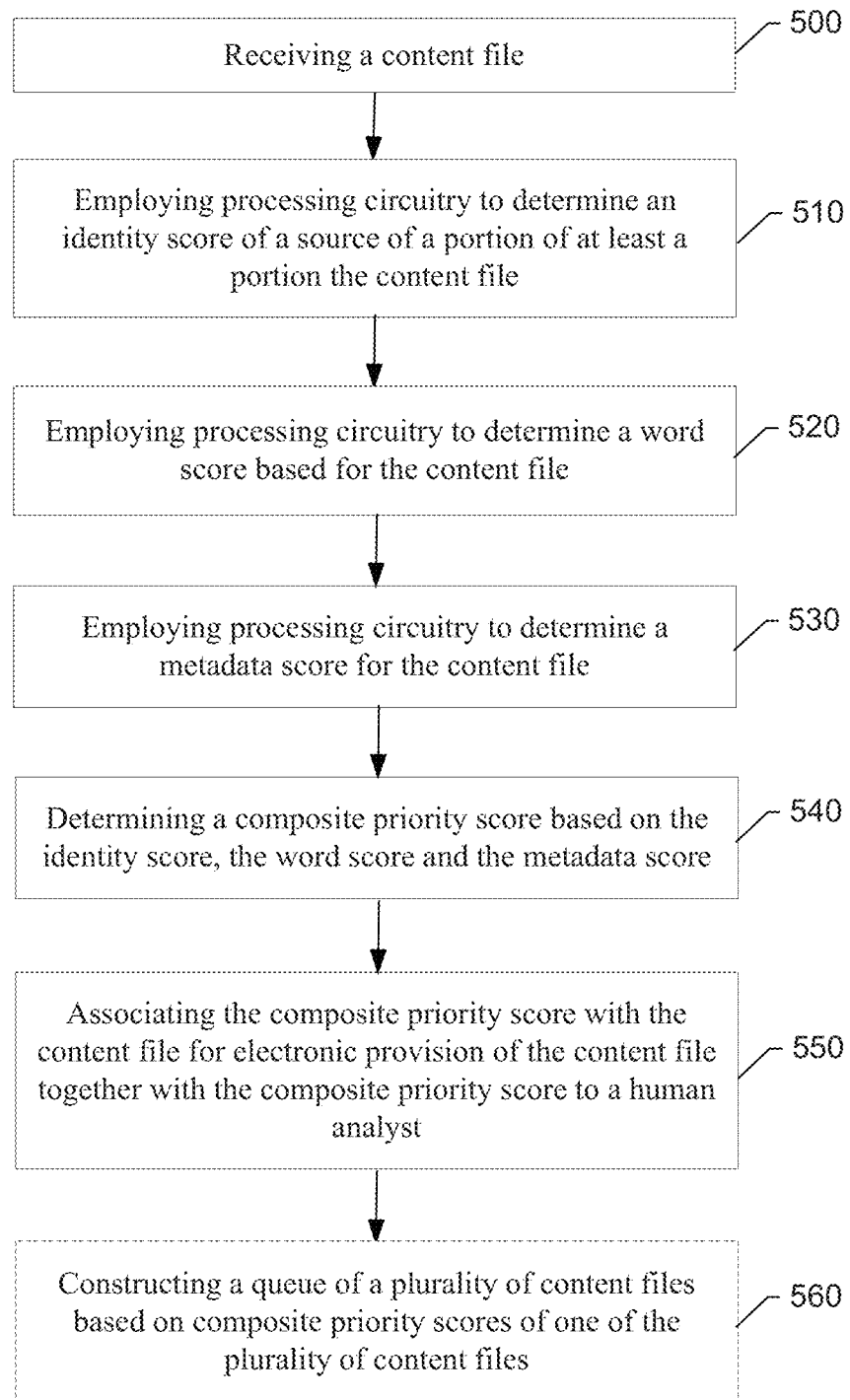
FIG. 6 illustrates a block diagram of a method that may be supported by the system of FIG. 1 according to an example embodiment.

From a technical perspective, the content manager 44 described above may be used to support some or all of the operations described above. As such, the platform described in FIGS. 1-2 may be used to facilitate the implementation of several computer program and/or network communication based interactions. As an example, FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 6, may include receiving the content file at operation 500, employing processing circuitry to determine an identity score of a source of a portion of at least a portion the content file at operation 510, to determine a word score based for the content file at operation 520 and to determine a metadata score for the content file at operation 530, determining a composite priority score based on the identity score, the word score and the metadata score at operation 540, and associating the composite priority score with the content file for electronic provision of the content file together with the composite priority score to a human analyst at operation 550. Although not required, the method may further include constructing a queue of a plurality of content files based on composite priority scores of one of the plurality of content files at operation 560. In some cases the content file may be an audio file. However, other file types are also permitted. When the content file is an audio file, determining the identity score may include comparing audio data in the content file to speaker data in a library of known speakers to determine if an identity of a speaker is determinable based on a degree of matching of the audio data to the speaker data, and, in response to determining the identity of the speaker, assigning the identity score based on a weight value associated with the speaker. In some embodiments, determining the word score may include comparing terms and phrases in the content file to a word library and, in response to determining a match between a term or phrase and an entry in the word library, assigning the word score based on a weight value associated with the entry. In an example embodiment, determining the metadata score may include extracting metadata from the content file and, in response to determining a match between extracted metadata and metadata in a metadata repository, assigning the metadata score based on a weight value associated with the metadata in the metadata repository. In some cases, a plurality of weighting tables may be provided and each weighting table corresponds to a separate case. In such cases, the metadata score, the word score and the identity score may be generated based on a weighting table of an analyst selected case. In an example embodiment, determining the composite priority score may include summing the identity score, the word score and the metadata score, or may include combining weighted values associated with the identity score, the word score and the metadata score.

In an example embodiment, an apparatus for performing the method of FIG. 6 above may comprise a processor (e.g., the processor 52) configured to perform some or each of the operations (500-560) described above. The processor may, for example, be configured to perform the operations (500-560) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although That which is claimed:

1. A method comprising:
receiving a content file including audio data;
employing processing circuitry to determine an identity score of a source of a portion of at least a portion the content file;
employing processing circuitry to determine a word score based for the content file;
employing processing circuitry to determine a metadata score for the content file;
determining a composite priority score based on the identity score, the word score and the metadata score; and
associating the composite priority score with the content file for electronic provision of the content file together with the composite priority score to a human analyst,
wherein determining the identity score comprises comparing the audio data in the content file to speaker data in a library of known speakers to determine if an identity of a speaker is determinable based on a degree of matching of the audio data to the speaker data, and, in response to determining the identity of the speaker, assigning the identity score based on a weight value associated with the speaker.

2. The method of claim 1, wherein determining the word score comprises comparing terms and phrases in the content file to a word library and, in response to determining a match between a term or phrase and an entry in the word library, assigning the word score based on a weight value associated with the entry.

3. The method of claim 1, wherein determining the metadata score comprises extracting metadata from the content file and, in response to determining a match between extracted metadata and metadata in a metadata repository, assigning the metadata score based on a weight value associated with the metadata in the metadata repository.

4. The method of claim 1, further comprising constructing a queue of a plurality of content files based on composite priority scores of one of the plurality of content files.

5. The method of claim 1, wherein a plurality of weighting tables are provided and each weighting table corresponds to a separate case, and wherein the metadata score, the word score and the identity score are generated based on a weighting table of an analyst selected case.

6. The method of claim 1, wherein determining the composite priority score comprises summing the identity score, the word score and the metadata score.

7. The method of claim 1, wherein determining the composite priority score comprises combining weighted values associated with the identity score, the word score and the metadata score.

8. An apparatus comprising processing circuitry configured to:
receive a content file including audio data;
determine an identity score of a source of a portion of at least a portion the content file;
determine a word score based for the content file;
determine a metadata score for the content file;
determine a composite priority score based on the identity score, the word score and the metadata score; and
associate the composite priority score with the content file for electronic provision of the content file together with the composite priority score to a human analyst,
wherein the processing circuitry being configured for determining the identity score comprises the processing circuitry being configured for comparing the audio data in the content file to speaker data in a library of known speakers to determine if an identity of a speaker is determinable based on a degree of matching of the audio data to the speaker data, and, in response to determining the identity of the speaker, assigning the identity score based on a weight value associated with the speaker.

9. The apparatus of claim 8, wherein the processing circuitry being configured for determining the word score comprises the processing circuitry being configured for comparing terms and phrases in the content file to a word library and, in response to determining a match between a term or phrase and an entry in the word library, assigning the word score based on a weight value associated with the entry.

10. The apparatus of claim 8, wherein the processing circuitry being configured for determining the metadata score comprises the processing circuitry being configured for extracting metadata from the content file and, in response to determining a match between extracted metadata and metadata in a metadata repository, assigning the metadata score based on a weight value associated with the metadata in the metadata repository.

11. The apparatus of claim 8, further comprising the processing circuitry being configured for constructing a queue of a plurality of content files based on composite priority scores of one of the plurality of content files.

12. The apparatus of claim 8, wherein a plurality of weighting tables are provided and each weighting table corresponds to a separate case, and wherein the metadata score, the word score and the identity score are generated based on a weighting table of an analyst selected case.

13. The apparatus of claim 8, wherein the processing circuitry being configured for determining the composite priority score comprises the processing circuitry being configured for summing the identity score, the word score and the metadata score.

14. The apparatus of claim 8, wherein the processing circuitry being configured for determining the composite priority score comprises the processing circuitry being configured for combining weighted values associated with the identity score, the word score and the metadata score.

15. A computer program product comprising a non-transitory computer-readable storage medium having computer-executable program code instructions stored therein, the computer-executable program code instructions comprising program code instructions for:
receiving a content file including audio data;
employing processing circuitry to determine an identity score of a source of a portion of at least a portion the content file;
employing processing circuitry to determine a word score based for the content file;
employing processing circuitry to determine a metadata score for the content file;
determining a composite priority score based on the identity score, the word score and the metadata score; and
associating the composite priority score with the content file for electronic provision of the content file together with the composite priority score to a human analyst,
determining the identity score comprises comparing the audio data in the content file to speaker data in a library of known speakers to determine if an identity of a speaker is determinable based on a degree of matching of the audio data to the speaker data, and, in response to determining the identity of the speaker, assigning the identity score based on a weight value associated with the speaker.

* * * * *